(12) United States Patent
Kimbrel et al.

(10) Patent No.: US 7,308,415 B2
(45) Date of Patent: Dec. 11, 2007

(54) DYNAMIC RESOURCE ALLOCATION USING PROJECTED FUTURE BENEFITS

(75) Inventors: Tracy J. Kimbrel, Cortlandt Manor, NY (US); Robert Krauthgamer, Ramat Hasharon (IL); Maria Minkoff, Somerville, MA (US); Baruch M. Schieber, White Plains, NY (US); Maxim I. Sviridenko, Mohegan Lake, NY (US); Jayram S. Thathachar, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1032 days.

(21) Appl. No.: 10/000,149

(22) Filed: Dec. 4, 2001

(65) Prior Publication Data

US 2003/0105655 A1 Jun. 5, 2003

(51) Int. Cl.
*G06F 9/46* (2006.01)
(52) U.S. Cl. .................... 705/8; 705/7; 705/9; 709/226
(58) Field of Classification Search ............... 705/8–9; 709/226
See application file for complete search history.

(56) References Cited

U.S. PATENT DOCUMENTS

| | | | | |
|---|---|---|---|---|
| 5,216,593 A | * | 6/1993 | Dietrich et al. | 345/467 |
| 6,085,216 A | * | 7/2000 | Huberman et al. | 718/104 |
| 6,230,200 B1 | * | 5/2001 | Forecast et al. | 709/226 |
| 6,374,227 B1 | * | 4/2002 | Ye | 705/8 |
| 6,954,931 B2 | * | 10/2005 | Shetty et al. | 718/104 |
| 2003/0037146 A1 | * | 2/2003 | O'Neill | 709/226 |
| 2005/0256778 A1 | * | 11/2005 | Boyd et al. | 705/26 |

FOREIGN PATENT DOCUMENTS

WO WO 9526535 A1 * 10/1995

OTHER PUBLICATIONS

"IBM's new commercial parallel computing solution improves business decisions" by Nadine Taylor, Business Wire, Dec. 7, 1994.*
"Adaptive algorithms for managing a distributed data processing" by Aman et al, IBM Systems Journal, 1997, vol. 36, issue 2, p. 242.*

(Continued)

*Primary Examiner*—Romain Jeanty
(74) *Attorney, Agent, or Firm*—Whitham, Curtis, Christofferson & Cook, PC; Stephen C. Kaufman

(57) ABSTRACT

A method for server allocation in a Web server "farm" is based on limited information regarding future loads to achieve close to the greatest possible revenue based on the assumption that revenue is proportional to the utilization of servers and differentiated by customer class. The method of server allocation uses an approach of "discounting the future". Specifically, when the policy faces the choice between a guaranteed benefit immediately and a potential benefit in the future, the decision is made by comparing the guaranteed benefit value with a discounted value of the potential future benefit. This discount factor is exponential in the number of time units that it would take a potential benefit to be materialized. The future benefits are discounted because by the time a benefit will be materialized, things might change and the algorithm might decide to make another choice for a potential (even greater) benefit.

6 Claims, 3 Drawing Sheets

OTHER PUBLICATIONS

"Online Server Allocation in a Server Farm via Benefit Task Systems" by Jayram et al, STOC'01,. Jul. 6-8, 2001.*

"On-Line Analysis of the TCP Acknowledgement Delay Problem" by Dooly et al, Journal of the ACM, Mar. 2001.*

"Lookahead routing for ring networks with random extra links" by Kovacevic, IEEE, 1995.*

"BPSS: A Scheduling support system for the Packaging Industry" by Adler et al, Operations Research, Jul.-Aug. 1993.*

"TCP Dynamic Acknowledgement Delay: Theory and Practice" by Dooly et al, Proceedings of the 30th annual ACM symposium on Theory of computing, ACM Press, 1998.*

Jayram "Online Server Allocation in a Server Farm Via Benefit Task Systems", Jun. 2001, Hersonissos, Crete. pp. 540-549.*

* cited by examiner

DYNAMIC RESOURCE ALLOCATION USING PROJECTED FUTURE BENEFITS

CROSS REFERENCE TO RELATED APPLICATION

The subject matter of this application is related to application Ser. No. 10/000,320 filed concurrently herewith by Tracy Kimbrel et al. For "Dynamic Resource Allocation Using Known Future Benefits". The subject matter of application Ser. No. 10/000,320 is incorporated herein by reference.

BACKGROUND OF THE INVENTION

1. Field of the Invention

The present invention generally relates to benefit task systems and, more particularly, to a policy for allocating resources to maximize some benefit. The invention may be applied to a variety of problems, and the benefit may be either tangible (e.g., profit) or intangible (e.g., customer satisfaction). In a specific example, the invention has particular application to server allocation in a Web site server "farm" given limited information regarding future loads to maximize profits for the Web hosting service provider. In another specific example, the invention can be applied to the allocation of telephone help in a way to improve customer satisfaction. In yet another example, the invention may be applied to distributed computing problems where the resources to be allocated are general purpose computers connected in a network and used to solve computationally intensive problems.

2. Background Description

Web content hosting is an important emerging market. Data centers and Web server "farms" are proliferating. The rationale for using such centers is that service providers can benefit from economies of scale and sharing of resources among multiple customers. This benefit in turn translates to lower cost of maintenance for the customers who purchase these hosting services. Web content hosting services are structured in many ways. One of the most prevailing ways is outsourcing: the customers deliver their Web site content in response to HTTP (hyper text transfer protocol) requests. Service providers will use "farms" of commodity servers to achieve this goal.

One of the components in the payment for such a service is "pay per served request". Thus, one of the main objectives of the service provider is to maximize the revenue from served requests while keeping the tab on the amount of resources used. Ideally, the allocation to a Web site should always suffice to serve its requests. However, due to a limited number of servers and the overhead incurred in changing the allocation of a server from one site to another, the system may become overloaded, and requests may be left unserved. Under the assumption that requests are not queued, a request is lost if it is not served at the time it is requested. The problem faced by the Web hosting service provider is how to utilize the available servers in the most profitable way. What adds to the complexity of this problem is the fact that future load of the sites is either unknown or known only for the very near future. A Web content hosting service provider therefore needs a procedure to dynamically allocate servers in a server "farm" to its customers' Web sites.

Similar considerations apply in the cases of computer servers and telephone support centers. Telephone support centers typically are computer controlled telephone networks having a number of technical support, order support and customer service support operators. These operators are resources that must be allocated to customers who call in. Computer software is used to answer telephone calls and direct the calls to the appropriate pool of operators. In this application, the operators are the resources to be allocated. The wait time that a customer experiences is inversely proportional to customer satisfaction and, therefore, it is important to be able to dynamically allocate resources in such a manner as to minimize customer wait time and increase customer satisfaction. In this application, customer benefit is the intangible benefit which is sought to be maximized.

In yet another example, the resources to be allocated are general purpose computers used to solve computationally intensive problems. In this environment, multiple computers can be used concurrently to solve a problem faster than a single computer can solve it. The computers would be connected in a network which may include the Internet. It has even been proposed that personal computers connected to the Internet might constitute resources that could be employed in solving such problems. It is anticipated that a market for such services will become standardized to some extent, so that the computer cycles become a commodity (resource) available from multiple vendors. It would be an advantage to dynamically allocate such resources.

SUMMARY OF THE INVENTION

It is therefore an object of the present invention to provide a method for server allocation given limited information regarding future requirements.

It is another object of the invention to provide a method for server allocation to achieve close to the greatest possible benefit based on the assumption that benefit is proportional to the utilization of resources.

According to the invention, the method of resource allocation uses an approach of "discounting the future". Specifically, when the policy faces the choice between a guaranteed benefit immediately and a potential benefit in the future, the decision is made by comparing the guaranteed benefit value with a discounted value of the potential future benefit. This discount factor is exponential in the number of time units that it would take a potential benefit to be materialized. The future benefits are discounted because by the time a benefit will be materialized, things might change and the algorithm might decide to make another choice for a potential (even greater) benefit.

In the practice of the invention, the resource allocation problem is modeled mathematically. In the model, time is divided into intervals. For the Web server farm problem, the assumption is made that each site's demand is uniformly spread throughout each such interval. Server allocations remain fixed for the duration of an interval. It is also assumed that servers are reallocated only at the beginning of an interval, and that a reallocated server is unavailable for the length of the interval during which it is reallocated. This represents the time to "scrub" the old site (customer data) to which the server was allocated, to reboot the server and to load the new site to which the server has been allocated. The length of the time interval is set to be equal to the non-negligible amount of time required for a server to prepare to serve a new customer. In current technology, this time is in the order of 5 or 10 minutes.

Each server has a rate of requests it can serve in a time interval. For simplicity, all rates are assumed to be identical. Due to practical concerns (mainly security constraints placed by customers), sharing of servers at the same time is not allowed. That is, customers share servers only in the sense of using the same servers at different times, but do not use the same servers at the same time. Thus, even in case of overload, some of the servers may be underutilized if they are allocated to sites with rates of requests lower than the servers' rate.

Each customer's demand is assumed to be associated with a benefit gained by the service provider in case a unit demand is satisfied. Given a fixed number of servers, the objective of the service provider is to find a time-varying server allocation that would maximize benefit gained by satisfying sites' demand. In a fully online implementation of the invention, only the demand of the current interval is known at the beginning of the interval. It is assumed that some amount of future demand is known to the service provider, and this is modeled by lookahead, which means that the demand of the sites is known for the next predetermined number of time intervals (following the current time interval). Lookahead requires that some forecasting mechanism is used to predict future demands. In the online setting, an online allocation algorithm is measured by its competitive ratio; that is, the maximum over all instances of the ratio of the benefit gained by the optimal offline allocation to the benefit gained by the online allocation on the same instance. Almost optimal algorithms (both deterministic and randomized) are used for any positive lookahead. The quality of the solution improves as the lookahead increases.

Interestingly, the model can be cast as a more general benefit task system. In this task system, we are given a set of states for each time, t, and a benefit function. The system can be at a single state at each time, and the benefit for time t is a function of the system states at times t−1 and t. The goal is to find a time varying sequence of states that maximizes the total benefit gained. That is, at each time t, we need to determine to which state should the system move (and this will be the state of the system at time t+1), and we gain the benefit that is determined by the benefit function. Similar to the server farm model, in the fully online implementation of the invention, only the benefit of the current step is known at the time the next move is determined, and in case of lookahead, L, the benefits of the next L steps (in addition to the current) are known.

It can be shown that benefit task systems capture also benefit maximization variants of well studied problems, such as the k-server problem (see A. Borodin and R. El-Yaniv in *On-Line Computation and Competitive Analysis*, Cambridge University Press, 1998) and metrical task systems (see *On-Line computation and Competitive Analysis*, cited above). Thus, our results hold for these variants as well, and show that the benefit variants of these problems may be more tractable than their cost minimization variants.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Although the invention is described in terms of a specific application to a Web server farm, this explanation is by way of example only. It will be understood by those skilled in the art that the invention may be applied to other applications. Among those applications are the customer telephone support problem and the allocation of computers to computationally intensive problems already mentioned. The Web server farm problem will serve to provide a concrete application of the invention which can be applied to other resource allocation problems.

Figure 1:
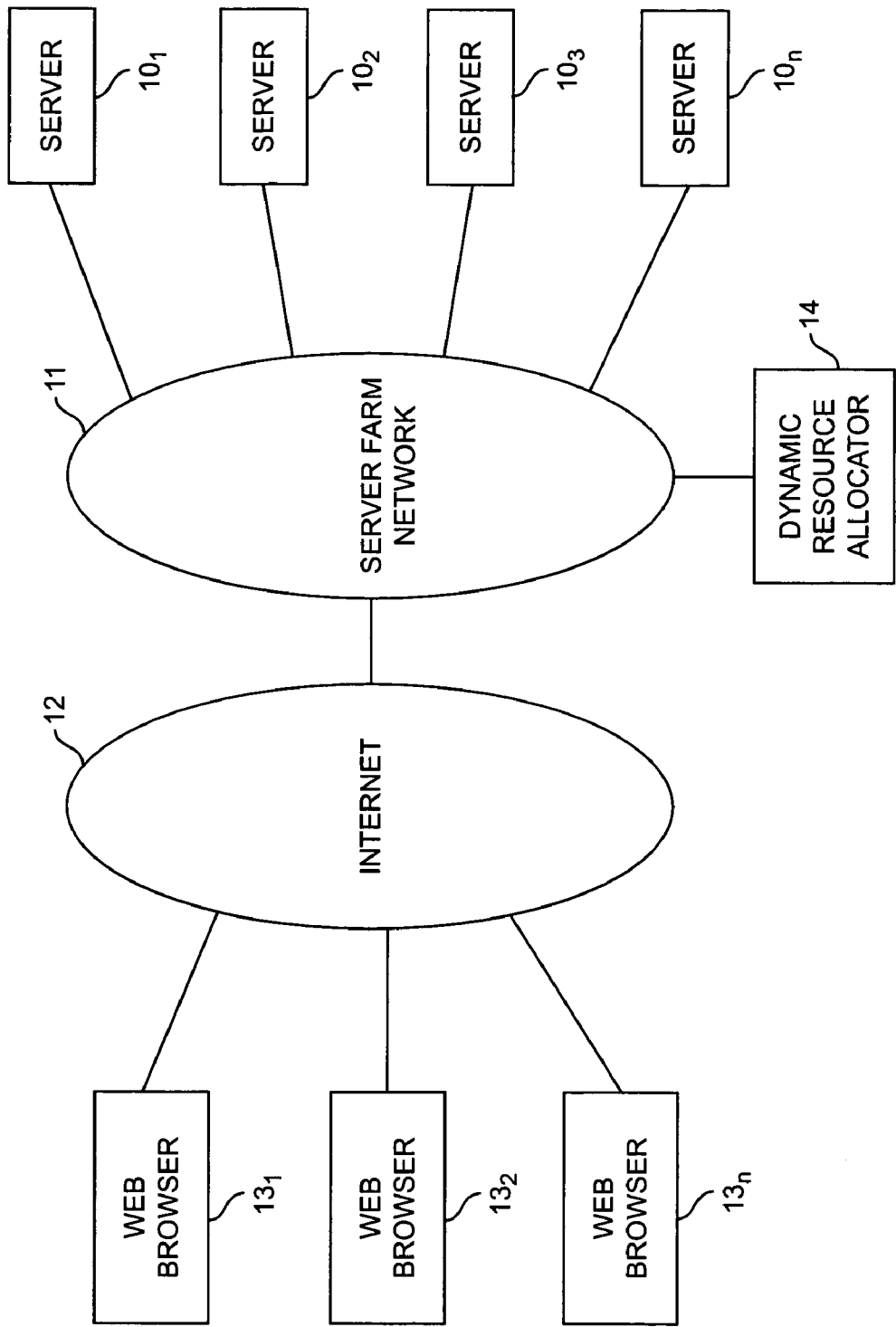
FIG. 1 is a block diagram illustrating the architecture of a Web server farm.

Referring now to the drawings, and more particularly to FIG. 1, there is shown, in generalized form, the architecture of a Web server farm of the type managed and maintained by a Web hosting service provider. The farm itself comprises a plurality of servers $10_1$, $10_2$, $10_3$, . . . , $10_n$ connected to a server farm network 11. The server farm network 11 connects the servers via the Internet 12 to a plurality of Web browsers $13_1$, $13_2$, . . ., $13_n$. Customers of the Web hosting service provider purchase hosting services, which include maintaining the customers' Web sites so that the Web sites can be readily accessed by persons using the Web browsers. The Web hosting service provider seeks to maximize profits by allocation of resources, i.e., the servers. This is the function of the dynamic resource allocator 14 connected to the server farm network.

Figure 2:
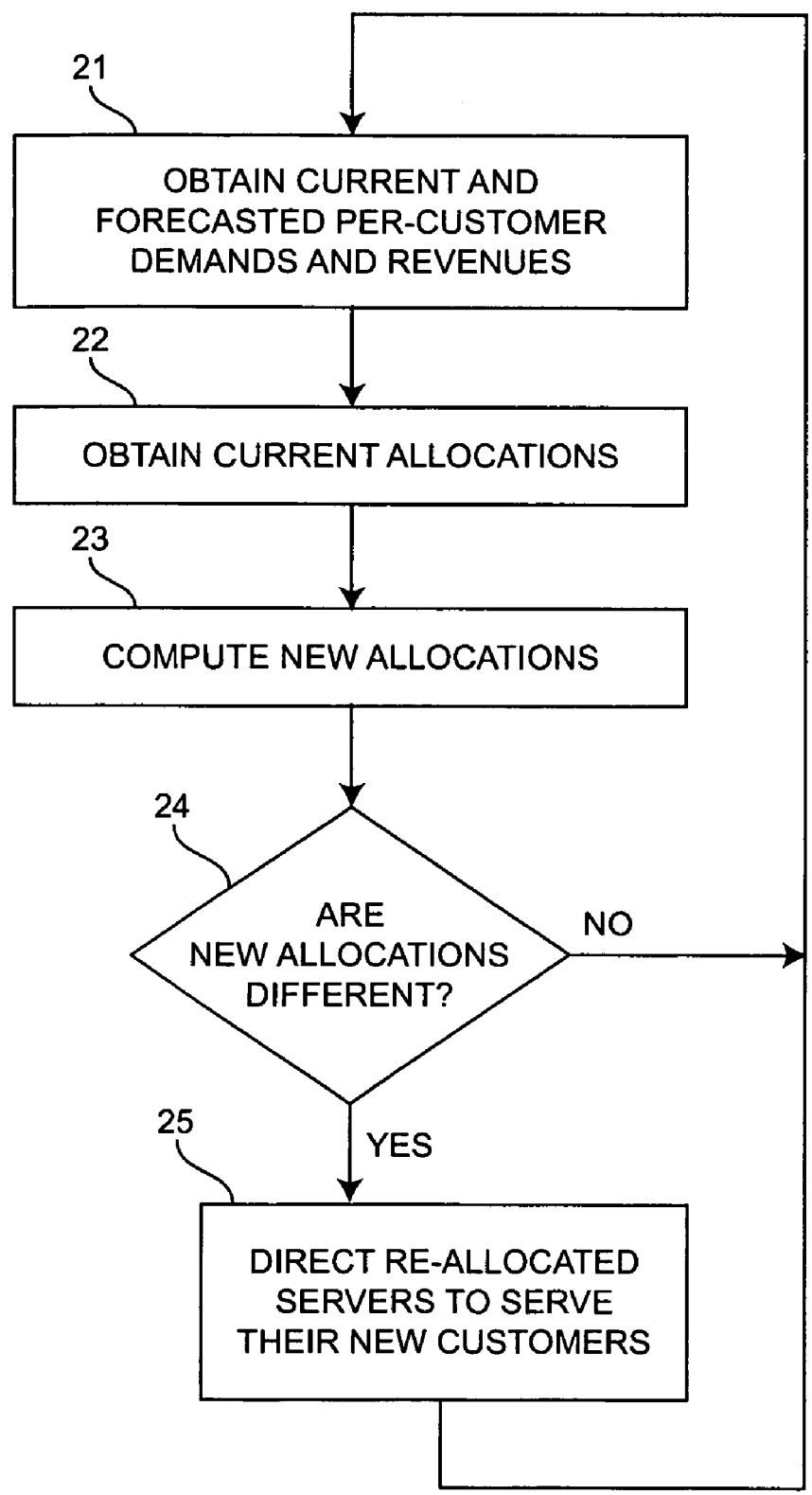
FIG. 2 is a flow diagram illustrating the process of allocating servers using projected future benefits.

FIG. 2 illustrates the general process implemented by the dynamic resource allocator 14. The process begins in function block 21 where the current and forecasted per-customer demands and revenues are obtained. Next, current allocations of servers are obtained in function block 22, and then new allocations are computed in function block 23. The computed new allocations are compared with the current allocations in decision block 24 and, if they are different, then in function block 25, re-allocated servers are directed to serve their new customers before the process loops back to function block 21. If the new allocations are not different from the current allocations, as determined in decision block 24, the process goes directly to function block 21 to begin the process anew.

The first function block 21, obtain current and forecasted per-customer demands and revenues, is outside the scope of the present invention. We assume some forecasting mechanism is used to determine the projected demands and benefits. As will be explained in more detail, the present invention is the algorithm for deciding what the allocations should be based on a given forecast; i.e., function block 23, compute new allocations. Allocations are made based on the result of this computation.

The Web Server Farm Problem

Suppose that we are given s Web sites that are to be served by k Web servers. (For simplicity, we assume that all servers are identical.) Time is divided into units. It is assumed that the demand of a Web site is uniform in each time unit. Each server has a "service rate" which is the number of requests to a Web site each server can serve in a time unit. Without loss of generality, we normalize the demands by the service rate so that a server can serve one request per time unit and demands of a site may be fractional. A Web server can be allocated to no more than one site at each time unit and it takes a time unit to change the allocation of a server.

A problem instance consists of the number of servers, k, the number of sites, s, a non-negative benefit matrix, $b_{i,t}$, denoting the benefit gained by serving a request of site $i \in [1 \ldots s]$ for time step $t \geq 1$, and a non-negative demand matrix, $\{d_{i,t}\}$, denoting the number of requests at site i for time step t. The goal is to find for each site $i \in [1 \ldots s]$ a time varying allocation $\{a_{i,t}\}$ of servers, so as to maximize the total benefit, as follows. The allocation must satisfy that for each t, $$\sum_{i=1}^{s} a_{i,t} \leq k. \text{ Only } a'_{i,t} = \min\{a_{i,t-1}, a_{i,t}\}$$

of the servers allocated to site i for the time step t are "productive", i.e., actually serve requests. We get that the total benefit of an allocation $\{a_{i,t}\}$ is $$\sum_{t \geq 1} \sum_{i=1}^{s} b_{i,t} \cdot \min\{d_{i,t}, a'_{i,t}\} + \sum_{t \geq 1} \sum_{i=1}^{s} b_{i,t} \cdot \min\{d_{i,t}, a_{i,t}, a_{i,t-1}\}.$$

In the online solution of the problem according to the present invention, we need to compute the allocation $\{a_{i,t}\}$ at time t given the demands so far, i.e., $\{d_{i,t'}\}$ for all i and $t' \leq t$. It is not difficult to show that any fully online algorithm may perform arbitrarily badly with respect to the offline optimal solution. This is true because of the one time unit lag in a server's availability. Thus, we consider online algorithms with lookahead. In the online verison with lookahead L, at each time t we are additionally given the demands for times $t+1, \ldots, t+L$, i.e., the entries $d_{i,t'}$ for $i \in [1 \ldots s]$ and $t+1 \leq t' \leq t+L$, and we need to compute the allocation at time t, i.e., $a_{i,t}$ for $i \in [1 \ldots s]$.

The Benefit Task System Problem

The Web server farm problem is a special case of the generalized task system benefit problem. In this problem, we are given (i) a set of possible states $U_t$ for each time $t \geq 0$ and (ii) a non-negative benefit function B whose domain is $\cup_t (U_t \times U_{t+1})$, that denotes, for each time t>0, the benefit that is accrued (at time t+1) by the transition from a state $U_t$ to a state $U_{t+1}$. The goal is to choose a state st for each time t so as to maximize the total benefit $$\sum_{t} B(s_t, s_{t+1}).$$

In the online version of the problem with lookahead L, the state $s_t \in U_t$ should be computed based on knowing only $U_{t'}$ for $t' \leq t+L$, and the restriction of the function B to pairs of these sets of states.

Observe that the Web server farm problem can be cast in this setting by identifying each possible allocation of servers to sites at time t with a state $S_{i,t}$, and defining the benefit function $B(S_{i,t}, S_{j,t+1})$ to be the benefit gained by changing the allocation at time t from the one represented by $S_{i,t}$ to the allocation at time t+1 represented by $S_{j,t+1}$, (In a sense, the set of states for all times is the same.) The number of states is exponential in the number of servers k, so the states and the benefit functions are implicit and follow from the more succinct representation of the Web server farm problem. For example, the values $B(s_{i,t}, s_{j,t+1})$ are not listed explicitly, and any single value can be efficiently computed when necessary.

Benefit maximization variants of well known problems can also be cast in this setting of a benefit task system. Consider the benefit version of the k-server problem with one difference. Instead of minimizing the cost of satisfying all requests, we define for each time t and any possible pair of server configurations, one at time t−1 and one at time t, a net benefit gained by satisfying the request starting from the configuration at time t−1 and ending at the configuration at time t. (Note that configuration at time t must include at least one server at the point of the request.) This benefit has to be non-negative and is composed of a fixed positive component that is reduced by the cost to move from the configuration at time t−1 to the configuration at time t. The goal in this case is to maximize the total benefit. It is not difficult to see that this problem can also be modeled by the benefit task system defined above and thus all our results apply to the benefit version of the k-server problem.

Similarly, consider the benefit version of a metrical task system. This version is similar to the classical metrical task system (see, for example, A. Borodin, N. Linial and M. E. Saks, "An optimal on-line algorithm for metrical task system", J. ACM, 39 (1992), pp. 745-763), with the difference that each task is associated with a vector of benefits, one for each state, such that the net benefit after subtracting the transition cost is non-negative. This model as well can be cast as a benefit task system and our results apply.

Deterministic Online Algorithms for Benefit Task Systems

Here, we describe two deterministic algorithms for benefit task systems with lookahead L. The first algorithm is a future discounting algorithm that achieves a competitive ratio of $$\left(1 + \frac{1}{L}\right)\sqrt[L]{L+1}.$$

Asymptotically in L, this ratio is $$1 + \frac{\Theta(\log L)}{L}.$$

The second algorithm is an intermittent reset algorithm that achieves a competitive ratio of $$1 + \frac{4}{(L-7)},$$

which is better than the first algorithm when L is sufficiently large.

The Future Discounting Algorithm

This is a deterministic algorithm for the benefit task system problem that achieves competitive ratio $$\left(1+\frac{1}{L}\right)\sqrt[L]{L+1}.$$

The algorithm is based on discounting future benefits in an exponential way. Consider a strategy that collects $L+1$ benefits $b_0, b_1, \ldots, b_L$ (in this order) in the next $L+1$ time steps, we define its anticipated benefit to be $b_0+b_1/\alpha+\ldots+b_L/\alpha_L$ (for a parameter $\alpha>1$ that we later choose as $\alpha=^L\sqrt{L+1}$).

The discounting algorithm greedily follows at each time step the strategy with the maximum anticipated benefit. That is, at every time step the algorithm finds a strategy for the next $L+1$ time steps whose anticipated benefit is maximal and acts (in this time step) according to this strategy. We stress that such a calculation is made every time step, so the strategy chosen in the current time step does not have to agree with the one chosen in the previous time step.

We note that this algorithm requires that a strategy with the greatest anticipated benefit can be computed efficiently. The following lemma provides this requirement when the input describes the states explicitly. Note that we cannot apply this lemma to the Web server farm problem since here the states are implicit and of exponential size, so we use the offline algorithm described in copending patent application Ser. No. 10/000,320.

Lemma 1. A strategy with the largest anticipated benefit can be computed in time that is polynomial in the number of states.

Proof. Use dynamic programming that goes interactively over the time steps and accumulate discounted benefits. As the additional benefit of the next time step depends only on the current state, it suffices to have a table of size proportional to the number of states.

Theorem 2. The above discounting algorithm has competitive ratio at most $$\left(1+\frac{1}{L}\right)\sqrt[L]{L+1}.$$

Proof. Consider the online algorithm at time t, and denote by $b_0, b_1, \ldots, b_L$ the sequence of benefits in the strategy with the largest anticipated benefit over all strategies that the online algorithm has at time t. Define $ON_t = b_0$ and $ON_{t+1}^{\neq L} = b_1/\alpha + \ldots + b_L/\alpha^L$, then $ON_t + ON_{t+1}^{\neq L}$ is the largest anticipated benefit over all the strategies that are available to the online algorithm at time t. Since the online algorithm follows this strategy at time t, $ON_t$ is the benefit that the online collects for this time step.

Fixing an offline algorithm arbitrarily, let $OFF_t$ denote the benefit that this offline algorithm collects at time t, and let $OFF^L$ be a shorthand for $OFF_t + 1/\alpha + \ldots + OFF_{t+L}/\alpha^L$.

One strategy that is considered by the online algorithm at time t is to first join the offline algorithm (i.e., move to the location of the offline at time t+1), and then follow the offline algorithm for the next L steps. The anticipated benefit of this strategy is at least $OFF_t^L$. Since the online algorithm follows at each time step the strategy with the maximum anticipated benefit, we get that $$ON_t + ON_{t+1}^{\neq L} \geq OFF_{t+1}^L \tag{1}$$

Another strategy that is considered by the online algorithm at time t is to follow the strategy that had the largest anticipated benefit at the previous time t−1. (Since the first step of that strategy has already taken at time t−1, we need to add an arbitrary move at the end.) The contribution of these benefits to the anticipated benefit at time t is larger by a factor of $\alpha$ than their contribution at time t−1, and so the anticipated benefit of this strategy is at least $\alpha ON_t^{\neq L}$. Since the online algorithm follows at each time step the strategy with the maximum anticipated benefit, we get that $$ON_t + ON_{t+1}^{\neq L} \geq \alpha ON_t^{\neq L} \tag{2}$$

Adding $$\left(1-\frac{1}{\alpha}\right)$$

times inequality (1) and $$\frac{1}{\alpha}$$

times inequality (2), we get that $$ON_t + ON_{t+1}^{\neq L} \geq ON_t^{\neq L} + \left(1-\frac{1}{\alpha}\right) OFF_{t+1}^L \tag{3}$$

Adding up inequality (3) over all time steps t (and assuming that the demands table starts and ends with L time units of zero demand), we get that $$\sum_t ON_t \geq \left(1-\frac{1}{\alpha}\right)\sum_t OFF_{t+1}^L = \left(1-\frac{1}{\alpha}\right)\left(\frac{1}{\alpha} + \ldots + \frac{1}{\alpha^L}\right)\sum_i OFF_t.$$

The last equality follows since every benefit that the offline collects is accumulated with each of the discounts $1/\alpha, \ldots, 1/\alpha^L$. We conclude that the competitive ratio of the algorithm is (choosing $\alpha=^L\sqrt{L+1}$):

$$\frac{\sum_i OFF_t}{\sum_t ON_t} \leq \frac{\alpha}{\frac{\alpha-1}{\alpha^L(\alpha-1)}} = \frac{\alpha^{L+1}}{\alpha^L-1} = \frac{(L+1)^{\frac{(L+1)}{L}}}{L} = \left(1+\frac{1}{L}\right)\sqrt[L]{L+1}.$$

An Intermittent Reset Algorithm

This is a deterministic intermittent reset online algorithm that has competitive ratio $$1+O\left(\frac{1}{L}\right)$$

for the benefit task system problem. This algorithm is motivated by the randomized algorithm described below that wastes one of every $L+1$ steps in order to gain the optimal benefit between wasted steps. Here, we waste one in every Θ(L) steps, but the choice of steps to waste is done carefully in a deterministic fashion and the overall benefit that we gain is close to that of the randomized algorithm.

The algorithm works in iterations each of length at least L/2. Let $s_i$ denote the start time of iteration i. Each iteration i consists of four steps as follows:

STEP 1: Consider all times $t=s_i+L/2+1 \ldots, s_i+L$. For each such time t, let $x_t$ denote the maximum benefit of any transition from a state at time t to a state at time t+1. Let T be the time t that minimizes $x_t$, i.e., $x_T=\min\{x_t:s_i+L/2+1\leq t\leq s_i+L\}$.

STEP 2: Compute the optimal sequence of transitions that starts at any state at time $s_i+1$ and ends at any state at time T. This can be done either by dynamic programming similar to Lemma 2 or by applying the offline algorithm above. (We remark that in the first iteration, the initial state is given and thus we may compute the optimal sequence of transitions from the initial state to any state at time T. The next step has to be modified accordingly.)

STEP 3: Move from the current state at time $s_i$ to the state at time $s_i+1$ that is the starting state of the optimal sequence computed above, and continue with the optimal sequence of moves to the state at time T.

STEP 4: Set the starting point $s_{i+1}=T$ for the next iteration.

Theorem 3. The above intermittent reset algorithm has competitive ratio at most $$1+\frac{4}{L-7}.$$

Proof We assume L is a multiple of 4, and otherwise round down to the nearest multiple of 4 (in the expense of-increasing the competitive ratio as explained later). We will call the starting times of the iterations "gaps". Denote the gaps by $s_1, S_2, \ldots$ We divide the transitions taken by the algorithm into two components, the moves taken in the gaps and the steps taken in the rest of the times. Consider the path taken by the online algorithm. It may not collect any benefit in the gaps, but since it computes the optimal paths between gaps (allowing arbitrary initial and terminal states adjacent to the gaps), clearly the benefit of the optimal offline between gaps is bounded by the benefit of the online algorithm between gaps.

Now we bound the benefit of the optimal algorithm in the gaps. Consider iteration i starting at si and computing $T=s_i+1$. Consider the portion of the online path from $s_i+L/2+1$ to si+1. Denote the length of this portion by a, i.e., $a=s_{i+1}-(s_i+L/2+1)$. Consider the portion of the path computed in the next iteration from $s_{i+1}+1$ to $s_i+L+1$. Denote the length of this portion by b, i.e., $b=s_i+L+1-(s_{i+1}+1)$. By our choice of L, L/2 is even and a+b=L/2−1. Thus, one of a and b is even and the other is odd. Assume a is odd and b is even; the proof is similar in the opposite case. (We note that ideally, we would like both a and b to be even, but choosing a+b to be even may lead to a worse case when both are odd.)

We claim that the benefit achieved by the online algorithm in these portions of the path at least $x_T \cdot (a+b-1)/2$. This is true since in every time step in the range there is a transition of benefit $x_T$ and thus the online algorithm can achieve benefit at least $x_T$ on every other transition, even if it collects no benefit on the other half of the transitions. Since a is odd, it can collect at least $x_T \cdot (a-1)/2$ in the first portion, and since b is even, it can collect at least $x_T \cdot b/2$ in the second.

Putting these together along with a+b=L/2−1, we have that the online benefit is at least $$x_T \cdot \left(\frac{a-1}{2}+\frac{b}{2}\right)=x_T \cdot \frac{L-4}{4}.$$

Since $s_i+L+1$ is always less than $s_{i+1}+L/2+1$, these portions are disjoint among iterations. Summing over all iterations, we have $$ON \cdot \left(\frac{4}{L-4}\right) \geq \sum_i x_{T_i},$$

where ON denotes the total benefit collected by the online algorithm and $x_{T_i}$ denotes the maximum benefit possible in the i'th gap. Accounting for the portions outside the gaps, we have $$ON \geq OFF - \sum_i x_{T_i},$$

where OFF denotes the optimal offline benefit. Putting these together and allowing for values of L that are not multiples of 4 yields the desired bound of $$1+\frac{4}{L-7}.$$

Special Cases of the Server Allocation Problem

We devise a deterministic online algorithm for the Web server farm problem with one server, two sites and lookahead L=1.

One server and Two Sites with Lookahead One

We devise a deterministic online algorithm for the Web server farm problem with one server, two sites and lookahead L=1. The algorithm has competitive ratio T=1+ϕ, where $$\phi=\frac{1+\sqrt{5}}{2} \approx 1.618$$

is the golden ratio. This ratio is nearly the best possible in this case, as we present a lower bound of $$\frac{3\sqrt{3}}{2} \approx 2.598$$

on the competitive ratio of any deterministic algorithm for this problem. We remark that the competitive ratio that we obtain in this case is much better than in the case of arbitrary number of sites, where the best possible competitive ratio is 4.

The algorithm is based on discounting future benefits. It is similar to the future discounting algorithm presented above (specialized to the case L=1) with the exception that the discount factor is taken to be $\phi$. The analysis for this case adds some complication to that of the general case, in order to take advantage of the limited number of sites. For example, a discount factor of 2 optimizes the analysis of the section relating to the future discounting algorithm, and then the competitive ratio is shown to be at most 4. The actual competitive ratio in this case is 3, which can be shown by an analysis similar to the one that we give here.

The following theorem states the improved competitive ratio for this case.

Theorem 4. The discounting algorithm with discount factor $\phi$ achieves competitive ratio $r=1+\phi \sim 2.618$ for the web server farm problem with one server and two sites.

Proof. Let us first describe the algorithm in more detail. We associate with each possible allocation its anticipated benefit, which combines the immediate benefit of this allocation and its future benefit. To compensate for the uncertainty of a future benefit (the algorithm might later decide to not collect these benefits), we discount it (with respect to an immediate benefit) by a factor of $\phi$. In other words, an action that causes the algorithm to collect a benefit b and to have the potential to collect in the future a benefit b' has anticipated benefit of $\phi \cdot b+b'$.

Suppose that the situation of the online algorithm at some time t is as described below. Assume, without loss of generality, the allocation of the server in the previous time unit is to the first site, as denoted by a triangle. Since the lookahead is L=1, the algorithm knows only the demands in the current time and in the next t+1.

$$d_{i,t} = \begin{bmatrix} \ldots & \triangleright x & x' & ? & ? & \ldots \\ \ldots & y & y' & ? & ? & \ldots \end{bmatrix}$$

The algorithm decides on the allocation of the server at time t as follows. If $\phi \cdot x + x' \geq y$, then the previous allocation is kept, i.e., the online algorithm allocates the server at time t to the first site. Otherwise the algorithm changes the allocation and the server is allocated to the second site. Observe that this decision matches the largest anticipated benefit for the algorithm. If it decides to stay with the allocation as before, it collects a benefit of x and will have the option to collect at next time t+1 an additional benefit x', yielding an anticipated benefit $\phi \cdot x + x'$. If the algorithm decides to change the allocation to the other site, then it collects no immediate benefit (at this point there is no way for the online algorithm to collect the benefit y), and in the next time t+1 it will have the option to collect a benefit y', yielding an anticipated benefit $\phi \cdot 0 + y' = y'$.

We will prove by induction on T that $$r \sum_{t \leq T} ON_t + q_{T+1} \cdot ON_{T+1}^* \geq \sum_{t \leq T} OFF_t + OFF_{T+1}^*$$

where $ON_t$ is the actual benefit collected at time t by the online algorithm; $ON_t^*$ is the potential benefit that the online algorithm will collect at time t if it remains allocated to the same site as in time t-1; $OFF_t$, $OFF_t^*$ are defined similarly for an arbitrary offline algorithm; and $q_t = \phi$ if at time t-1 the online and the offline solutions have the same allocation (i.e., if they have the same "starting position" for time t), and $q_t=1$ otherwise. (Note that $ON_t$ is either $ON_t^*$ in case the potential benefit is gained or 0.) In a sense, this is a potential function analysis; see for example A. Borodin and R. El-Yaniv, *On-line Computation and Competitive Analysis*, Cambridge University Press (1998).

Proving Equation (4) would complete the proof, since we can assume that the demands matrix is padded with zeros from both sides, and obtain for the last time T that $$r \sum_t ON_t \geq \sum_t OFF_t,$$

as required.

The base case of the induction follows from padding the demands matrix with zeros from both sides. For the inductive step, i.e., that the induction hypothesis (4) for time T follows from that of time T−1, it suffices to show that $$r \cdot ON_T + q_{T+1} \cdot ON_{T+1}^* - q_T \cdot ON_T^* \geq OFF_T + OFF_{T+1}^* - OFF_t^* \quad (5)$$

We prove inequality (5) by verifying it over all cases. Denote the benefits at times T, T+1 by x, x', y, y' as above. Assume without loss of generality that at time T−1 the server is allocated to the first site. The total number of cases is eight since there are two possible decisions for the online, and four possible decisions for the offline.

Consider first the cases in which the allocation of the offline at times T and T+1 are the same. Then at time T the offline collects the benefit $OFF_t^*$, and hence $OFF_T = OFF_t^*$. In addition $ON_t^* = x$, so inequality (5) simplifies to $$r \cdot ON_T + q_{T+1} ON_{T+1}^* - q_T x \geq OFF_{T+1}^*$$

1. $q_T = \phi$, $q_{T+1} = \phi$. Then both offline and online collect x. We need to show that $$r \cdot x + \phi \cdot x' - \phi \cdot x \geq x'$$

i.e., that $x + (\phi - 1) x' > 0$ which clearly holds. ✓

2. $q_T = 1$, $q_{T+1} = 1$. Then offline collects y and online collects x. We need to show that $$r \cdot x + x' - x \geq y'$$

i.e., that $\phi \cdot x' \geq y'$, which holds since online keeps the previous allocation. ✓

3. $q_T = \phi$, $q_{T+1} = 1$. Then offline collects x and online does not collect x. We need to show that $$r \cdot 0 + y' - \phi \cdot x \geq x'$$

which holds since online changes allocation. ✓

4. $q_T = 1$, $q_{T+1} = \phi$. Then offline collects y and online does not collect x. We need to show that $$r \cdot 0 + \phi \cdot y' - x \geq y'$$

i.e., that $y' \geq 1/(\phi-1) \cdot x = \phi \cdot x$ which holds since online changes allocation. ✓

Consider now the cases in which the allocation of the offline at times T and T+1 are different. Then the benefit of the offline at time T is $OFF_T = 0$. In addition $ON_T^* = x$, so inequality (5) simplifies to $$r \cdot ON_T q_{T+1} ON_{T+1}^* - q_T x \geq OFF_{T+1}^* - OFF_t^*$$

5. $q_T = \phi$, $q_{T+1} = \phi$. Then offline and online both do not collect x. We need to show that $$r \cdot 0 + \phi \cdot y' - \phi \cdot x \geq y' - x$$

i.e., that $y' \geq x$, which clearly holds since online changes allocation. ✓

6. $q_T=1$, $q_{T+1}=1$. Then offline does not collect y and online does not collect x. We need to show that $$r \cdot 0 + y' - x \geq x' - y$$

and since online changes allocation we indeed get $y' \geq \phi x + x' \geq x + x' - y$. ✓

7. $q_T=\phi$, $q_{T+1}=1$. Then offline does not collect x and online collects x. We need to show that $$r \cdot x + x' - \phi \cdot x \geq y' - x$$

i.e. that $2x + x' \geq y'$ which holds since online keeps the previous allocation. ✓

8. $q_T=1$, $q_{T+1}=\phi$. Then offline does not collect y and online collects x. We need to show that $$r \cdot x + \phi \cdot x' - x \geq x' - y$$

i.e. that $\phi \cdot x + (\phi - 1)x' + y \geq 0$ which clearly holds. ✓

Multiple Servers with Lookahead One

We present an online algorithm for the web server farm problem with multiple servers and lookahead one.

For the case of an even k, we describe below the algorithm and its analysis. In the case of an odd k>3, the algorithm is more involved. We remark that it applies the algorithm below (for an even number of servers) on the "first" k−1 servers, and yet another algorithm for the additional server.

For an even k, the algorithm splits the set of servers into two sets of equal size. The first set of servers is allocated so as to always collect the k/2 biggest benefits (demands) on the odd time steps. These servers spend the even time steps in reallocation to those sites where they will be able to collect in the following time step, which is odd, the k/2 biggest benefits. On even time steps, these servers may collect zero benefit in the worst case. The second set of servers is scheduled in a symmetric way. It collects the k/2 biggest benefits on the even time steps and spend the odd time steps on reallocation to the best sites for the following time step which is even. We conclude that at each time t, the total benefit that the k servers collect is at least as large as the k/2 biggest benefits at this time t, which is clearly at least half the benefit that an optimal offline algorithm can collect at this time t. Therefore, the competitive ratio of this algorithm is at most 2.

Theorem 5. There is a deterministic algorithm for the web server farm problem that achieves competitive ratio 2 when the number of servers k is even, and competitive ratio $c_k=2+2/(2k-1)$ when $k \geq 3$ is odd.

Proof. The case of an even k was already shown above. We thus deal below with the case that k is odd.

For an odd k, the algorithm splits the servers into three groups. Two groups are of size (k−1)/2 each, and the third group contains one server. The first group of servers collects the (k−1)/2 biggest benefits on the odd time steps. The second group collects the (k−1)/2 biggest benefits on the even time steps. Let $F_t$ denote the (k+1)/2 biggest benefit on step t. The last server tries to collect $F_t$ on each time step, as follows. On the step t the server either collects $F_t$ or it moves to the web site q such that $d_{q,\,t+1}=F_{t+1}$. The server collects $F_t$ if $2F_t > F_{t+1}$; otherwise, the server moves to the web site q. If the server collects $F_t$ on some step t, it wastes the step t+1 on a move to the (k+1)/2'th best web site q for the step t+2, i.e., $d_{q,\,t+2}=F_{t+2}$.

For the sake of analysis we split time into phases: the first phase starts at the time step 0 (by convention we assume that benefits at this time step are equal to zero), phase ends at the time step t+1 if the server from the third group collects $F_t$ on step t, the next phase starts at step t+2 and so on. Notice that the server from the third group always starts the phase allocated at the (k+1)/2'th best web site. Consider the first phase. We claim that $$F_t \geq \frac{1}{4}\sum_{i=1}^{t+1} F_i.$$

Indeed, $2F_i \leq F_{i+1}$ for $i=1, \ldots, t-1$ and $2F_t > F_{t+1}$; therefore, $$\sum_{i=1}^{t+1} F_i < F_t \sum_{i=1}^{t+1} \frac{1}{2^{t-i}} \leq 2F_t \sum_{j=0}^{\infty} \frac{1}{2^j} = 4F_t.$$

For $p \leq k$, if $S(\tau, p)$ is a sum of p best benefits on step $\tau$, then $$\sum_\tau S(\tau, p) \geq \frac{p}{k} \sum_\tau OFF_\tau$$

and $$\sum_{\tau=1}^{t+1} ON_\tau \geq \sum_{\tau=1}^{t+1} S\left(\tau, \frac{(k-1)}{2}\right) + F_t \geq$$

$$\frac{3}{4}\sum_{\tau=1}^{t+1} S\left(\tau, \frac{(k-1)}{2}\right) + \frac{1}{4}\sum_{\tau=1}^{t+1} S\left(\tau, \frac{(k+1)}{2}\right) \geq$$

$$\left(\frac{3(k-1)}{8k} + \frac{(k+1)}{8k}\right)\sum_{\tau=1}^{t+1} OFF_\tau = \frac{2k-1}{4k} OFF = c_k^{-1} OFF.$$

The same proof works for any phase and therefore we proved that our algorithm is $c_k$-competitive for odd $k \geq 3$.

Randomized Online Algorithms

In this section we derive tight bounds on the competitive ratio of randomized online algorithms with lookahead L. These bounds are stated in the following theorem We remark that our randomized algorithm requires only O(log L) random bits, independent of the input length.

Theorem 6. There is a randomized online algorithm with competitive ratio 1+1/L. Furthermore, no randomized algorithm achieves a lower competitive ratio.

Proof. The idea behind the algorithm is that with lookahead L, we can compute an optimal path for L time steps. However, we may have to make a poor move, in which we collect little or no benefit, in order to reach the first state on this path. After following this path, we can again choose the best state to move to during the next time step, possibly without collecting any benefit at all, but ensuring the best starting point for the next L steps. We lose only a 1/(L+1) fraction of the available benefit over each L+1 time steps. We refer to this as the "resetting" algorithm, since it operates in stages, after each of which it resets to an optimal state for the upcoming stage. The online algorithm will collect at least as much benefit as the optimal offline algorithm on every step except the resetting steps. Notice that there are L+1 possible "phases", i.e., phase j means (potentially) giving up all benefit during steps i·(L+1)+j for each i, where $0 \leq j \leq L$. Randomizing over these choices, the online algorithm loses in expectation only a $1/(L+1)$ fraction of the offline benefit, and the competitive ratio is at most $$\frac{1}{1 - \frac{1}{(L+1)}} = 1 + \frac{1}{L}.$$

For any $\in > 0$, we demonstrate a lower bound of $(L+1)/(L+\in)$ for the one-server problem. Our randomized adversary generates a demand matrix $d_{i,t}$ with $\lceil 1/\in \rceil$ rows and L+2 columns (which can be repeated indefinitely), and a revenue matrix of all ones. The first column of the demand matrix contains all zeroes, the next L columns contain all ones, and exactly one randomly chosen row in the last column contains a one and the rest contain zeroes. The optimal choice is for the server to move during the first step to the row containing the one in column L+2, and to stay in that row for L+1 steps, collecting a total benefit of L+1. Any randomized online strategy stands only an $\in$ chance of choosing this row, and with probability at least $1-\in$ must either miss the benefit in this column, or forgo benefit in some earlier column in order to collect it. Thus, the expected benefit collected by the randomized online algorithm is at most $L+\in$.

Figure 3:
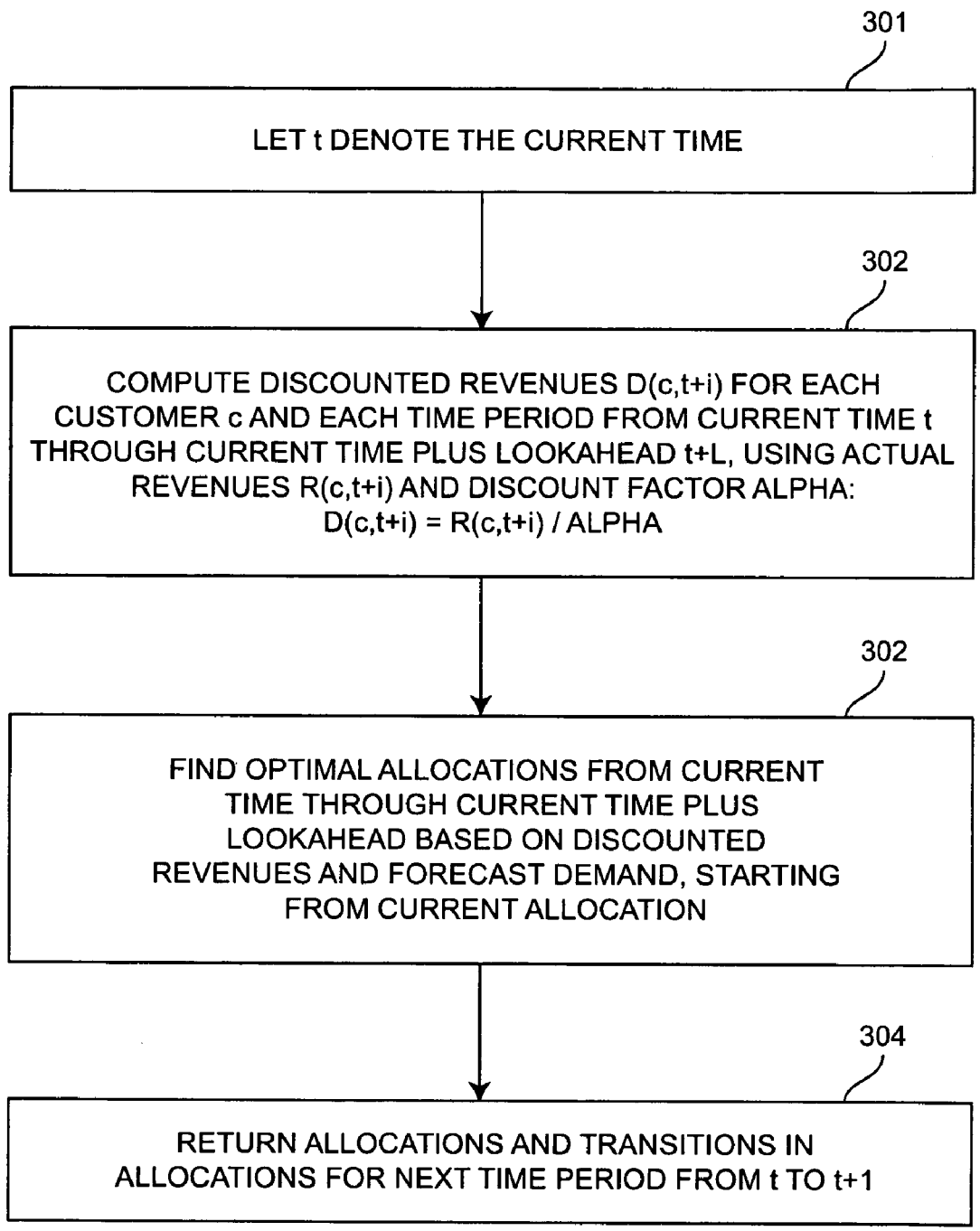
FIG. 3 is a flow diagram illustrating the process of computing new allocations of servers.

Returning now to the drawings, the computation of new allocations (function block 23 in FIG. 2) is shown in FIG. 3. The process begins with an initialization step in function block 31 where t is set to the current time. In function block 32, the discounted revenues $D(c, t+i)$ are computed for each customer c and each time period from current time t through current time plus lookahead t+L, using actual revenues $R(c, t+i)$ and discount factor alpha:

$$D(c, t+i) = \frac{R(c, t+i)}{\alpha}$$

Based on this computation, the optimal allocations from the current time through current time plus lookahead are found, starting from the current allocation, in function block 33. Finally, in function block 34, allocations and transitions in allocations for the next time period from t to t+1 are returned.

While the invention has been described in terms of a preferred embodiment, those skilled in the art will recognize that the invention can be practiced with modification within the scope of the appended claims.

The invention claimed is:

1. A computer implemented method of resource allocation to yield a benefit comprising the steps of:
    associating each customer's demand with a benefit gained;
    finding a time-varying allocation of resources that would yield a benefit which is based on the benefit gained associated with one or more customer's demands;
    implementing the time-varying allocation of resources amongst one or more customers to yield said benefit;
    discounting future benefits; and
    finding optimal allocations of resources from current time through current time plus lookahead based on discounted benefit and forecast demand, wherein the step of discounting future benefits is based on a future discounting algorithm,
    wherein the future discounting algorithm is a deterministic algorithm that achieves a competitive ratio of $(1+1/L)(L+1)^{1/L}$, where L is a lookahead factor which models some amount of future demand known to a provider of the resource.

2. A computer implemented method of resource allocation to yield a benefit comprising the steps of:
    associating each customer's demand with a benefit gained;
    finding a time-varying allocation of resources that would yield a benefit which is based on the benefit gained associated with one or more customer's demands;
    implementing the time-varying allocation of resources amongst one or more customers to yield said benefit;
    discounting future benefits; and
    finding optimal allocations of resources from current time through current time plus lookahead based on discounted benefit and forecast demand, wherein the step of discounting future benefits is based on a future discounting algorithm,
    wherein the algorithm is an intermittent reset algorithm that achieves a competitive ratio of $1+4/(L-7)$, where L is a lookahead factor which models some amount of future demand known to a provider of the resource.

3. A computer implemented method of resource allocation to yield a benefit comprising the steps of:
    modeling a resource allocation problem mathematically;
    in the model obtained from said modeling step, dividing time into intervals of fixed length based on the assumption that demand is uniformly spread throughout each such interval; and
    associating each customer's demand with a benefit gained; and finding a time-varying allocation of resources that would maximize a benefit which is based on the benefit gained associated with one or more customer's demands;
    implementing the time-varying allocation of resources amongst one or more customers to maximize said benefit;
    discounting future benefits; and
    finding optimal allocations of resources from current time through current time plus lookahead based on discounted benefit and forecast demand, wherein the step of discounting future benefits is based on a future discounting algorithm,
    wherein the future discounting algorithm is a deterministic algorithm that achieves a competitive ratio of $(1+1/L)(L+1)^{1/L}$, where L is a lookahead factor which models some amount of future demand known to a provider of the resource.

4. A computer implemented method of resource allocation to yield a benefit comprising the steps of:
    modeling a resource allocation problem mathematically;
    in the model obtained from said modeling step, dividing time into intervals of fixed length based on the assumption that demand is uniformly spread throughout each such interval; and
    associating each customer's demand with a benefit gained; and
    finding a time-varying allocation of resources that would maximize a benefit which is based on the benefit gained associated with one or more customer's demands; and implementing the time-varying allocation of resources amongst one or more customers to maximize said benefit, wherein the algorithm is an intermittent reset algorithm that achieves a competitive ratio of $1+4/(L-7)$, where L is a lookahead factor which models some amount of future demand known to a provider of the resource.

5. A method for server allocation in a Web server "farm" based on limited information regarding future loads to achieve close to greatest possible revenue based on an assumption that revenue is proportional to the utilization of servers and differentiated by customer class comprising the steps of:

modeling the server allocation problem mathematically;

in the model, dividing time into intervals of fixed length based on the assumption that each site's demand is uniformly spread throughout each such interval;

maintaining server allocations fixed for the duration of an interval, servers being reallocated only at the beginning of an interval, and a reallocated server being unavailable for the length of the interval during which it is reallocated providing time to "scrub" the old site (customer data) to which the server was allocated, to reboot the server and to load the new site to which the server has been allocated, each server having a rate of requests it can server in a time interval and customers share servers only in the sense of using the same servers at different times, but do not use the same servers at the same time; and associating each customer's demand with a benefit gained by the service provider in case a unit demand is satisfied and finding a time-varying server allocation that would maximize benefit gained by satisfying sites' demand, wherein the future discounting algorithm is a deterministic algorithm that achieves a competitive ratio of $(1+1/L)(L-1)^{1/L}$, where L is a lookahead factor which models some amount of future demand known to a provider of the resource.

6. A method for server allocation in a Web server "farm" based on limited information regarding future loads to achieve close to greatest possible revenue based on an assumption that revenue is proportional to the utilization of servers and differentiated by customer class comprising the steps of:

modeling the server allocation problem mathematically;

in the model, dividing time into intervals of fixed length based on the assumption that each site's demand is uniformly spread throughout each such interval;

maintaining server allocations fixed for the duration of an interval, servers being reallocated only at the beginning of an interval, and a reallocated server being unavailable for the length of the interval during which it is reallocated providing time to "scrub" the old site (customer data) to which the server was allocated, to reboot the server and to load the new site to which the server has been allocated, each server having a rate of requests it can server in a time interval and customers share servers only in the sense of using the same servers at different times, but do not use the same servers at the same time; and associating each customer's demand with a benefit gained by the service provider in case a unit demand is satisfied and finding a time-varying server allocation that would maximize benefit gained by satisfying sites' demand, wherein the algorithm is an intermittent reset algorithm that achieves a competitive ratio of $1+4/(L-7)$, where L is a lookahead factor which models some amount of future demand known to a provider of the resource.

* * * * *